US009557786B2

United States Patent
Wang et al.

(10) Patent No.: US 9,557,786 B2
(45) Date of Patent: Jan. 31, 2017

(54) POWER THERMAL POLICY USING MICRO-THROTTLE

(71) Applicant: MEDIATEK INC., Hsinchu (TW)

(72) Inventors: Hui-Hsuan Wang, Taoyuan County (TW); Jen-Chieh Yang, Hsinchu (TW); Lee-Kee Yong, Hsinchu (TW)

(73) Assignee: MEDIATEK INC., HsinChu (TW)

( * ) Notice: Subject to any disclaimer, the term of this patent is extended or adjusted under 35 U.S.C. 154(b) by 203 days.

(21) Appl. No.: 14/490,958

(22) Filed: Sep. 19, 2014

(65) Prior Publication Data

US 2015/0134988 A1    May 14, 2015

Related U.S. Application Data

(60) Provisional application No. 61/902,417, filed on Nov. 11, 2013.

(51) Int. Cl.
*G06F 1/20* (2006.01)
*G06F 1/32* (2006.01)

(52) U.S. Cl.
CPC .............. *G06F 1/206* (2013.01); *G06F 1/324* (2013.01); *G06F 1/3206* (2013.01);
(Continued)

(58) Field of Classification Search
CPC ........ G06F 1/206; G06F 1/3206; G06F 1/324; G06F 1/3296
See application file for complete search history.

(56) References Cited

U.S. PATENT DOCUMENTS

| 6,415,388 B1 * | 7/2002 | Browning | G06F 1/206 |
| | | | 702/132 |
| 7,617,020 B2 * | 11/2009 | Chang | G06F 1/206 |
| | | | 361/690 |

(Continued)

FOREIGN PATENT DOCUMENTS

| CN | 100432892 C | 1/2002 |
| CN | 101171562 A | 5/2005 |
| CN | 102281623 A | 6/2010 |

OTHER PUBLICATIONS

SIPO, Search Report for the CN patent application 201410619058.4 (no English translation is available) dated Jul. 18, 2016 (9 pages).

*Primary Examiner* — Stefan Stoynov
(74) *Attorney, Agent, or Firm* — Imperium Patent Works; Zheng Jin; Helen Mao

(57) ABSTRACT

Method and apparatus are provided for thermal management of mobile devices. In one novel aspect, a micro-throttle method is used to control the fast rising temperature for the device. In one embodiment, the thermal management method determines a temperature of the mobile device and compares the temperature with a plurality of predefined temperature thresholds. The thermal management applies a first micro-throttle solution upon detecting the temperature reaches a first predefined temperature threshold and applies a second micro-throttle solution upon detecting the temperature reaches a second predefined temperature threshold. In one embodiment, the first and the second micro-throttle solution control the slope of the rising temperature to be below a first predefined slope and a second predefined slope, respectively. In one embodiment, the temperature is controlled by adjusting the operating frequency or voltage of at least one heat-generating component of the mobile device.

18 Claims, 5 Drawing Sheets

(52) U.S. Cl.
CPC ........ *G06F 1/3296* (2013.01); *Y02B 60/1217* (2013.01); *Y02B 60/1275* (2013.01); *Y02B 60/1285* (2013.01)

(56) References Cited

U.S. PATENT DOCUMENTS

| | | | |
|---|---|---|---|
| 7,630,856 B2* | 12/2009 | Rockenfeller | G06F 1/206 361/688 |
| 2003/0125900 A1* | 7/2003 | Orenstien | G06F 1/3203 702/132 |
| 2006/0254296 A1 | 11/2006 | Finkelstein et al. | 62/259.2 |
| 2014/0006818 A1* | 1/2014 | Doshi | G06F 1/3203 713/320 |
| 2014/0032949 A1* | 1/2014 | Kim | G06F 1/3206 713/322 |

\* cited by examiner

POWER THERMAL POLICY USING MICRO-THROTTLE

CROSS REFERENCE TO RELATED APPLICATIONS

This application claims priority under 35 U.S.C. §119 from U.S. Provisional Application No. 61/902,417, entitled "New Power Thermal Policy PTP←Micro-Throttle→Thermal Throttle," filed on Nov. 11, 2013, the subject matter of which is incorporated herein by reference.

TECHNICAL FIELD

The disclosed embodiments relate generally to wireless network communication device, and, more particularly, to new power thermal policy using micro-throttle.

BACKGROUND

With the advance of semiconductor technologies and the like, the performance of CPUs and processors used in mobile devices has been improved remarkably. For example, an operating frequency of the level of GHz has been used widely in mobile phones. When the system speed and core requirements reach higher limits, the power consumption of CPUs and processors is also increasing. As a result, more and more heat needs to be dissipated in the limited space of a mobile phone in order to control the skin surface temperature (Tskin) of the mobile phone.

Thermal management is one of the key challenges in the design of today's mobile devices, such as smartphones. The power consumption in smart devices have grown exponentially compounded by the needs for higher data rate, more multitasking applications, and the increasing number of background tasks for popular applications such as email and social networking. The higher performance requirement for the smart devices means peak maximum throughput is frequently required. It leads to higher clock frequencies, which inevitably generates more heat from various integrated circuits (ICs) and/or other components in the device. Currently, each IC may contain one or more heat-generating components. With increasing number of components running at high clock frequencies inside a small compact device, heat dissipation requires advanced solutions for thermal management.

FIG. 1 shows a current method of thermal management. It illustrates a temperature curve under thermal throttle. As shown, a threshold temperature, namely $T_{bound}$ is configured for a mobile device, such as a mobile phone, a tablet, a wearable device, a laptop, etc. The mobile device monitors the temperature starting from $t_0$. As the data throughput or processing power in the device increases, the temperature of the device starts to increase. In many situations, the high demands for faster data rate, faster and better graphical processes from an application compounded with large number of background running tasks requires high frequencies from various components/ICs of the device. The heat dissipation in a small, compact smart device, such as smartphone is much harder because the area to dissipate the heat is limited. Therefore, the temperature of the device increases quickly. In the current thermal management, there is no power throttling until the temperature reaches the predefined or preconfigured threshold temperature $T_{bound}$. As a result, at time $t_1$, the temperature reaches the preconfigured threshold $T_{bound}$. Upon detecting the temperature rises to the preconfigured threshold $T_{bound}$, the device starts thermal throttle by controlling the power of the ICs or components of the device that generates heat. Since the throttle takes time, the temperature continues to rise after $t_1$. At time $t_2$, the temperature starts to drop because the power throttling of the devices reduces the heat sources. At time $t_3$, the temperature drops back to the preconfigured threshold $T_{bound}$. With the throttling for thermal control starts, the temperature of the device bounces near the preconfigured temperature $T_{bound}$ as shown in FIG. 1.

The problem of the current thermal management for smart devices is that it causes large performance degradation. The current method controls heat generation components or ICs in the device for thermal throttling. Such process may greatly reduce the performance of the smart device. For example, one way to reduce heat generation of a ICs or components of the smart device is to lower its operation frequency, which results in lower processing speed. The problem aggravates with the increasing demands for high performance of the smart devices. For example, to control the temperature, the throttling lower the clock frequency, which results in less processing power for data throughput, which results in backlog queues of pending processing. When the temperature reaches an acceptable level, the backlog data, together with continuous tasks, requires high performance of the device. Such high performance on the devices makes the temperature fast approaching the preconfigured threshold $T_{bound}$ again, which requires performance-degraded throttling.

Enhancement and improvements are needed to prevent the device to reach the $T_{bound}$ too fast. A more efficient way of thermal management for mobile devices is required.

SUMMARY

Method and apparatus are provided for thermal management of mobile devices. In one novel aspect, a micro-throttle method is used to control the fast rising temperature for the device. In one embodiment, the thermal management method determines a temperature of the mobile device and compares the temperature with a plurality of predefined temperature thresholds. The thermal management applies a first micro-throttle solution upon detecting the temperature reaches a first predefined temperature threshold. In one embodiment, the first micro-throttle solution controls the slope of the rising temperature to be below a first predefined slope. The thermal management applies a second micro-throttle solution upon detecting the temperature reaches a second predefined temperature threshold. In one embodiment, the second micro-throttle solution controls the slope of the rising temperature to be below a second predefined slope. In one embodiment, the first predefined slope is the same as the second predefine slope. In one embodiment, the thermal management controls the slope of the rising temperature by controlling the operating voltage of at least one heat-generating components of the mobile device. In another embodiment, the thermal management controls the slope of the rising temperature by controlling the operating frequency of at least one heat-generating components of the mobile device. In yet another embodiment, the micro-throttle solutions are determined based on the benchmark performance of the mobile device, such as the AnTuTu benchmark.

In another novel aspect, adaptive feedbacks are used to further enhance the micro-throttle. In one embodiment, the fixed throttling on temperature thresholds is used. The fixed throttling method applies different degrees of throttling to different temperature threshold. In another embodiment, the adaptive control for fixed slope is used. The adaptive slope control method dynamically sends slope feedback such that the rising slope of the temperature is controlled to be a fixed value. In yet another embodiment of the current invention, the adaptive slope control for time prediction is used. In the adaptive prediction time method, the mobile device dynamically sends slope feedback to the thermal management of the mobile device. The thermal management adjusts the power of the system accordingly to control the temperature such that the temperature stabilized at a predefined fixed predicted time.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
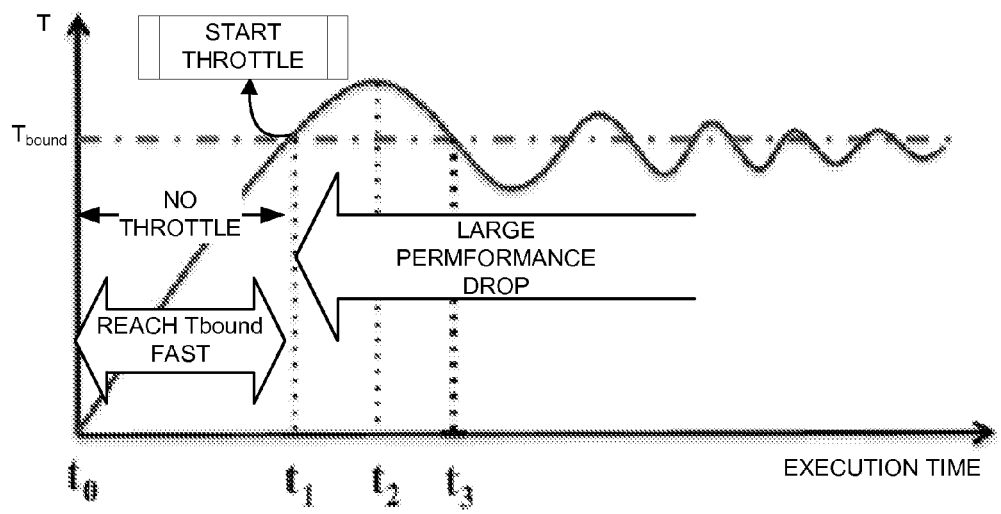
FIG. 1 (prior art) illustrates a temperature curve under thermal throttle.
Figure 2:
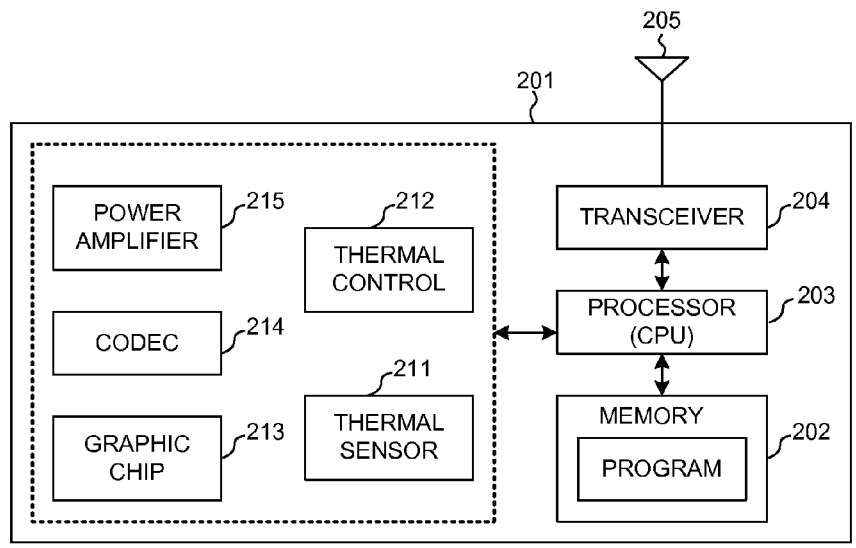
FIG. 2 is a simplified block diagram of a mobile device with new power thermal policy in accordance with one novel aspect.

FIG. 2 is a simplified block diagram of a mobile device with new power thermal policy in accordance with one novel aspect. Mobile device 201 has an antenna 205, which transmits and receives radio signals. A RF transceiver module 204, coupled with the antenna, receives RF signals from antenna 205, converts them to baseband signals and sends them to processor (CPU) 203. RF transceiver 205 also converts received baseband signals from processor 203, converts them to RF signals, and sends out to antenna 205. Processor 203 processes the received baseband signals and invokes different functional modules to perform features in mobile device 201. Memory 202 stores program instructions and data to control the operations of smart mobile station 201.

Mobile device 201 also includes other modules that carry out different tasks in accordance with embodiments of the current invention. The different modules can be implemented by software, firmware, hardware, or any combination thereof. The function modules, when executed by the processors 203 allow mobile device 201 carry out embodiments of the current invention such that improvements and enhancements for thermal management are achieved. A thermal sensor 211 detects thermal changes, temperatures. Thermal sensor 211 detects and monitors temperature level of the system. A thermal control 212 controls system thermal level. In one embodiment of the current invention, thermal control 212 communicates with thermal sensor 211 and uses micro throttle to enhance thermal management. Thermal control 212 obtains temperature information of mobile device 201. Thermal control 212 compares the obtained temperature information with a plurality of preconfigured or pre-defined temperature thresholds. Based on the results, thermal control 212 determines a different throttling method. Thermal control 212 applies different throttling strategies for different temperature ranges. In one embodiment, thermal control 212 controls the slope of the rising of temperature. Thermal control 212 applies different slope to different temperature range. Using micro thermal control alleviates sharp performance drop in the traditional way. Different modules also include an exemplary graphic chip, or graphic processing unit (GPU) 213 and a codec 214. Graphic chip 213 handles graphic processing for mobile device 201. Codec 214 handles codec processes for mobile device 201. A power amplifier 215 controls power of different heat-generating components and/or components of mobile device 201. In one embodiment, thermal control 212 controls the slope of temperature through adjusting powers of one or more heat-generating components and/or components of mobile device 201. Thermal control 212 communicates with power amplifier 215 and controls the power of different heat-generating components and components of mobile device 201 such that the temperature is below a predefined threshold based on the value of the temperature.

In one novel aspect, thermal management for mobile devices uses a dynamic unbalanced slope control, which slows the speed of temperature rising to a temperature threshold. The new thermal management method, based on the detected system temperature, applies different micro throttling before the temperature reaches the $T_{bound}$ threshold. During the micro throttling, the system performance does not degrade too much because the adjustment of the clock frequency or power throttle is in a small range. Therefore, the multi-staged micro throttling slows the speed of rising temperature without sacrificing a lot of system performance.

Figure 3:
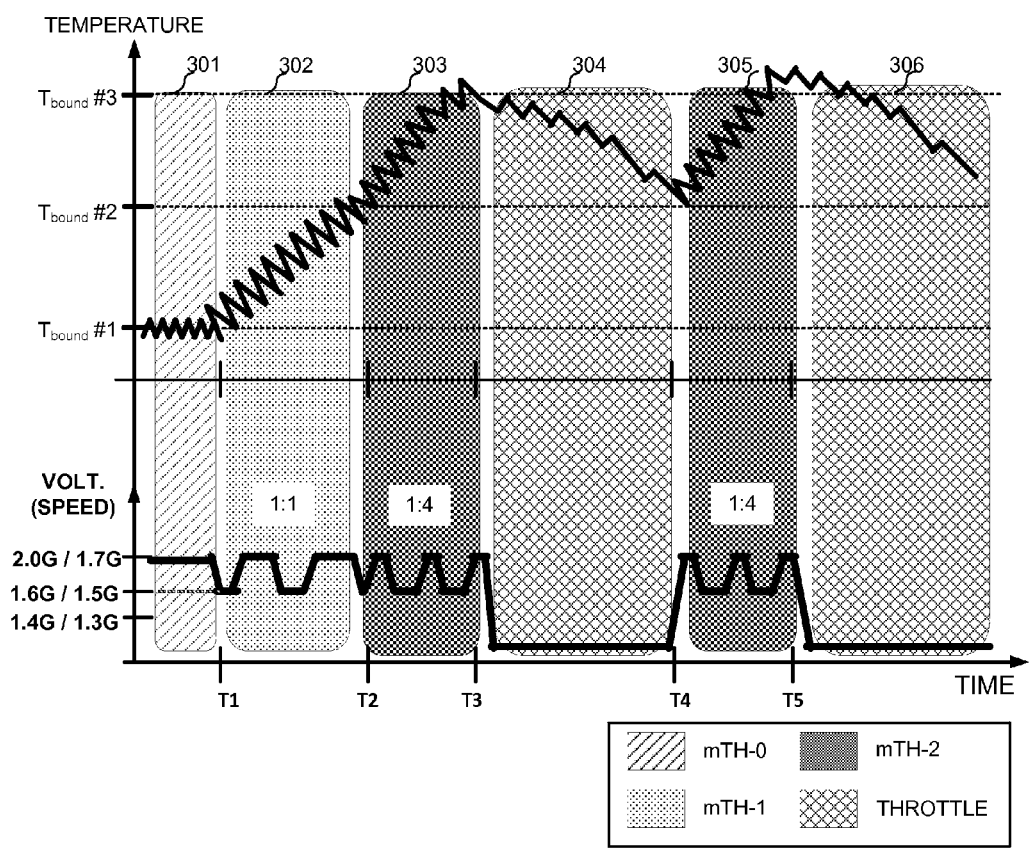
FIG. 3 illustrates an exemplary temperature curve under micro-throttle.

FIG. 3 illustrates an exemplary temperature curve under micro-throttle. Three temperature thresholds, $T_{bound}$ #1, $T_{bound}$ #2, and $T_{bound}$ #3, are configured. It is understood by one of ordinary skills in the art that other number of thresholds can be configured. For example, more than three thresholds can be configured depends on performance and power consumption data of a mobile device. Different model, different manufacture, and different feature set of the mobile devices can all be factors in determining the number of temperature thresholds to be configured. The number of temperature threshold can also be changed, either through network configuration or through local reconfiguration of the device. The value of these temperature thresholds can also vary depending on different factors of the device, such as the model, the different chip sets used, different mechanical design of the device, and/or features supported by the device. The value of the temperature thresholds can be preconfigured or dynamically updated, either through network configuration or through local reconfiguration of the device. In one embodiment, $T_{bound}$ #1 is preconfigured to be 45-Celsius degree; $T_{bound}$ #2 is configured to be 65-Celsius degree; and $T_{bound}$ #3 is configured to be 90-Celsius degree.

Different stages of micro throttling and traditional throttling are used to enhance the thermal management of the mobile device. As shown in FIG. 3, when the temperature is below $T_{bound}$ #1, the processor is running at full performance. In an example as shown in FIG. 3, it is running at 2.0

G/1.7 G. In period 301, which starts from time T1, micro throttle zero (mTH-0) controls the slope of the temperature such that it will not rise too fast. At time T1, the temperature crosses over $T_{bound}$ #1. The mobile device enters period 302, which uses micro-throttle one (mTH-1). At period 302, micro-throttle one adjusts the power consumption so that the slope of the rising temperature is controlled to be below a preconfigured first slope threshold. In one embodiment, micro-throttle one controls the power consumption by adjusting the voltage and/or speed of one or more heat-generating components of the mobile device. As an example shown in FIG. 3, the speed of a heat-generating component in the mobile device is adjusted down from 2.0 G/1.7 G to 1.6 G/1.5 G in a controlled manner. In period 302, since the temperature is still in a relative lower range, micro-throttle one does not need to greatly reduce the speed of the heat-generating component. The performance of the mobile device is not significantly sacrificed. The reduced power consumption effectively controls the slope of the rising temperature. In one embodiment, the voltage/speed of the heat-generating component does not stay in the lowered level. Instead, it is adjusted to throttle between the higher level of 2.0 G/1.7 G and the lower level of 1.6 G/1.5 G, such the rising slope of the temperature is controlled at below the first predefined threshold. In one embodiment, the ratio of the heat-generating component operating at 2.0 G/1.7 G to the heat-generating component operating at 1.6 G/1.5 G is 1:1. The ratio of the micro-throttle one is predefined/preconfigured. The ratio can be dynamically updated as well. The determination of the ratio may depend on factors of the mobile device. For example, thermal performance benchmark of different heat-generating components and/or components of the mobile device can be used in determining the ratio for different micro-throttle period. In one embodiment, AnTuTu performance is used in determining the ratio. Other factors, such the model of the device, the feature set of the device and the mechanical design of the device can all be considered in determining the ratio. In one embodiment, micro-throttle may even disable one or more heat-generating components.

Micro-throttle one effectively controls the slope of the rising temperature so that the temperature would not reach a high threshold of $T_{bound}$ too fast. At the same time, because the adjustment to the speed or power consumption of the one or more heat-generating components or components of the mobile device is controlled at a lower level, the performance of the mobile device is not greatly reduced. As the temperature continues to rise, a new micro-throttle is triggered. At time T2, the temperature rises to the preconfigured $T_{bound}$ #2. The mobile device enters period 303, which uses micro-throttle two (mTH-2). At period 302, micro-throttle one adjusts the power consumption so that the slope of the rising temperature is controlled to be below a preconfigured second slope threshold. Entering period 303, mTH-2 continues to adjust the speed of the heat-generating component to curb the speed of the rising temperature. In one embodiment, the ratio of the heat-generating component operating at 2.0 G/1.7 G to the heat-generating component operating at 1.6 G/1.5 G changes to 1:4. In micro-throttle two the heat-generating component operates in a lower level of speed for a longer period than in micro-throttle one. Similarly, the ratio can be preconfigured/defined or dynamically updated. Similar factors are considered in determining the value of the ratio for micro-throttle two. Similarly, the second slope threshold can be preconfigured/defined or dynamically updated. Similar factors are considered in determining the value of the second slope threshold. Since the heat-generating component speed adjustment is still in a small range, the performance sacrifice of the mobile device keeps low. In one embodiment, micro-throttle may even disable one or more heat-generating components.

By controlling the slope of the rising temperature in different micro-throttle stages, the mobile device avoids the problem of fast-rising temperature of the device that triggers performance degraded throttling too fast. Therefore, the overall performance of the mobile device can be greatly improved. At time T3, the temperature of the mobile device rises to over the preconfigured $T_{bound}$ #3. The mobile device enters period 304. $T_{bound}$ #3 is preconfigured to be in the range of the traditional $T_{bound}$. Therefore, at period 304, traditional throttling is used to control the temperature. The voltage/speed of the heat-generating component drops significantly. As an example, the voltage/speed of the heat-generating component drops to below 1.4 G/1.3 G. During this period, it is possible that the performance of the mobile device is noticeably dropped.

Using micro-throttle for thermal management may also shorten the period of the performance-degraded traditional throttling. At time T4, the temperature of the mobile device drops back to $T_{bound}$ #2. Upon detecting the temperature drops back to $T_{bound}$ #2, the mobile device enters period 305, which switches back to micro-throttle two (mTH-2). Upon entering period 305, mTH-2 adjusts the voltage/speed of the heat-generating component back throttle between 2.0 G/1.7 G and 1.6 G/1.5 G. The ratio of the heat-generating component operating at 2.0 G/1.7 G to the heat-generating component operating at 1.6 G/1.5 G is 1:4. During this period, the performance of the mobile device improves while the temperature is effectively controlled as well. At T5, the temperature of the mobile device rises to be over $T_{bound}$ #3. The mobile device enters period 306, which goes back to the traditional throttling to bring the temperature down. The speed of the heat-generating component drops significantly.

Figure 4:
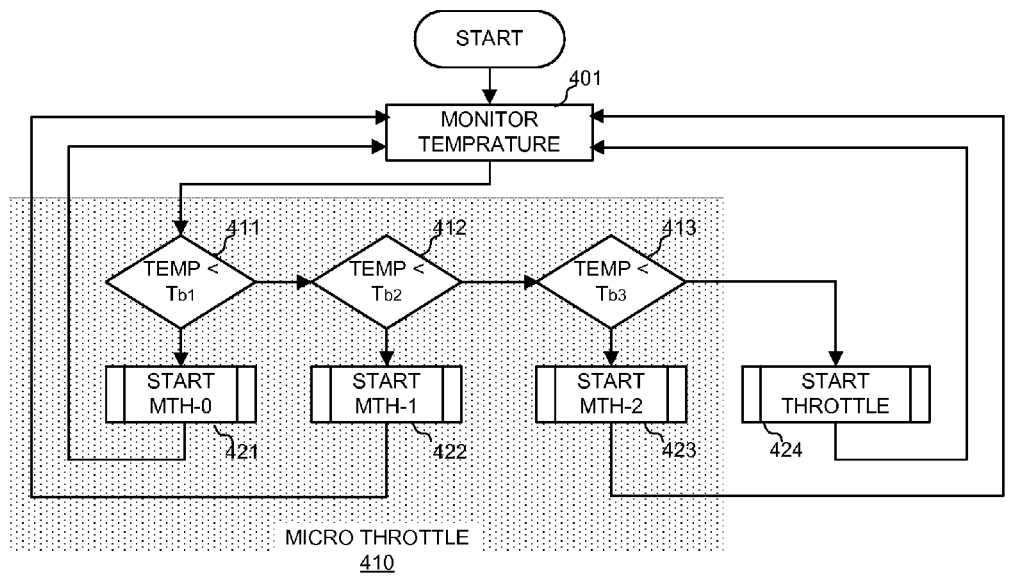
FIG. 4 is an exemplary flow chart of the micro-throttle in accordance to embodiments of the current invention.

FIG. 4 is an exemplary flow chart of the micro-throttle in accordance to embodiments of the current invention. In one novel aspect, the mobile device monitors the temperatures and applies micro-throttle and traditional throttle for thermal management. A micro-throttle stage 410, as shown in FIG. 4, may include one or more different stages. Micro-throttle 410 can effectively prevent the temperature of the mobile device from rising too fast to trigger the traditional throttle. Micro-throttle 410 combined with the traditional thermal throttle, effectively controls the temperature of the mobile device while maintaining the performance of the mobile device.

At step 401, the mobile device monitors temperature. At step 411, the mobile device checks whether the current temperature is below a predefined first temperature threshold, Tb1. If at step 411, the mobile device determines that the temperature is below Tb1, it moves to step 421. At step 421, the mobile device applies micro-throttle zero (mTH-0) and continues monitors the temperature as in step 401. If step 411 determines the temperature is above Tb1, the mobile device moves to step 412. At step 412, the mobile device checks whether the current temperature is below a predefined second temperature threshold, Tb2. If at step 412 the mobile device determines that the temperature is below Tb2, it moves to step 422. At step 422, the mobile device applies micro-throttle one (mTH-1) and continues monitors the temperature as in step 401. If step 412 determines temperature is above Tb2, the mobile device moves to step 413. At step 413, the mobile device checks whether the current temperature is below a predefined second temperature threshold, Tb3. If at step 413 the mobile device determines that the temperature is below Tb3, it moves to step 423. At step 423, the mobile device applies micro-throttle two (mTH-2) and continues monitors the temperature as in step 401. If step 413 determines the temperature is above Tb3, the mobile device moves to step 424. At step 424, the mobile device starts traditional throttle to lower the temperature of the device and continues monitors the temperature as in step 401. In one embodiment, micro-throttle may even disable one or more heat-generating components.

One of the advantages of the micro throttle thermal management is improved system performance. In one hand, the micro throttle prevents the temperature of the mobile device from rising too fast. It limits the time of thermal throttling, which has significant negative impact on the system performance. On the other hand, the multi-level temperature configuration applying to corresponding micro throttle stages also shortens the costly thermal throttling period. All these result in a better system performance while controlling the temperature of the mobile device effectively.

Figure 5:
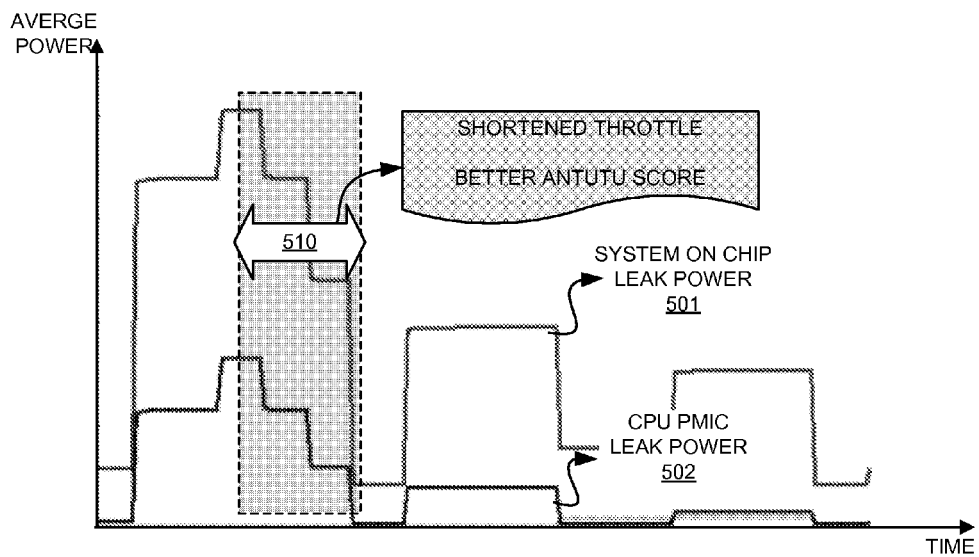
FIG. 5 illustrates power behavior under micro-throttle.

FIG. 5 illustrates power behavior under micro-throttle. As an example of the improved system performance using micro throttling for thermal management, FIG. 5 shows a specific output of system performance applying micro throttle for thermal management. Graph 501 illustrates average power level for a system on chip (SoC) over the time. Graph 502 illustrates average power level for a CPU PMIC (power management IC) chip over the time. One of the benchmarks that measure system and/or component performance is AnTuTu score. AnTuTu is a popular tool that measures performance of android devices. It includes performance benchmarks on the device level as well on chip level. Applying micro throttle for thermal management increases AnTuTu score as shown in FIG. 5. A period 510 illustrates the amount of time for the traditional thermal throttling. The performance of both chips, the SoC and CPU PMIC both drop dramatically. Compared with system without micro throttle, period 510 is greatly shortened. Therefore, the overall system performance increases. It results in better AnTuTu score for the system as well as for chips SoC and CPU PMIC.

Figure 6:
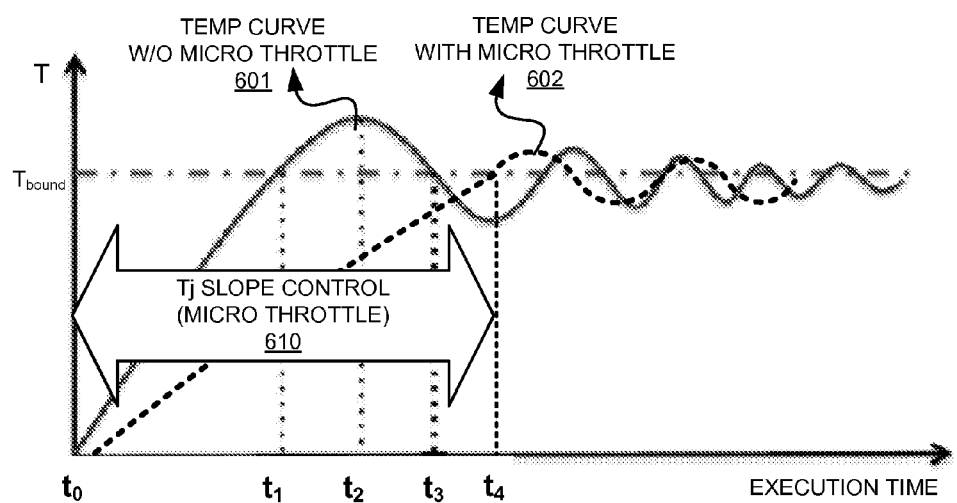
FIG. 6 illustrates temperature slope control with thermal throttle.

FIG. 6 illustrates temperature slope control with thermal throttle. A temperature threshold $T_{bound}$ is configured such that the thermal management of the mobile device controls the temperature to stay within a range below $T_{bound}$. Graph 601 shows the temperature curve without micro throttle for thermal management. The mobile device monitors the temperature starting from $t_0$. Without micro throttling, the temperature continues to rise without any adjustment until the temperature reaches $T_{bound}$. Therefore, the temperature of the device increases quickly. As a result, at time $t_1$, the temperature reaches the preconfigured threshold $T_{bound}$. Upon detecting the temperature rises to the preconfigured threshold $T_{bound}$, the device starts thermal throttle by controlling the power of the heat-generating components or components of the device that generates heat. Since the throttle takes time, the temperature continues to rise after $t_1$. At time $t_2$, the temperature starts to drop because the power throttling of the devices reduces the heat sources. At time $t_3$, the temperature drops back to the preconfigured threshold $T_{bound}$. With the throttling for thermal control starts, the temperature of the device bounces near the preconfigured temperature $T_{bound}$. As shown from graph 601, the temperature of mobile device reaches $T_{bound}$ fast, resulting in long period of costly thermal throttling starting from $t_1$.

In comparison, graph 602 of FIG. 6 illustrates an exemplary temperature curve without micro throttle. When micro throttle is used, the thermal management in the mobile device controls the rising slope of the temperature before it reaches $T_{bound}$. Multi-stage micro throttle can be used with different parameter configured for each stage. In one embodiment, the parameters for the multi-stage micro throttle can be enhanced based on benchmarks of the system and heat-generating components and/or components of the mobile device. During the micro throttle process, the performance of the system and the heat-generating components are maintained at a relative high level because it slowly adjusts the speed or power level of the components. The temperature of the mobile device, as shown in graph 602, reaches $T_{bound}$ at a much slower pace until $t_4$. It is understood by one of ordinary skills in the art that $t_4$ may be as early as in between $t_1$ and $t_2$ and can be further delayed beyond. A period 610 between $t_0$ and $t_4$ is the micro throttle period also called $T_j$ heat up slope control.

In other novel aspects, the micro throttle process can be further enhanced applying different $T_j$ heat up slope control. In one embodiment, the fixed throttling on $T_j$ thresholds is used. In the fixed throttling method, multiple $T_j$ thresholds are defined. For different $T_j$ threshold ranges, different degrees of throttling are used. The configuration of $T_j$ thresholds and degrees of throttling are adjusted for different thermal solutions and different chip leakage corners.

In another embodiment, the adaptive method of $T_j$ slopes control for fixed slope is used. The adaptive slope control method dynamically sends $T_j$ slope feed back to the thermal management of the mobile device. The thermal management adjusts the power of the system accordingly to control the rising of the temperature at a fixed slope. In the dynamic slope control method, multiple $T_j$ thresholds can be configured. The thermal management of the mobile device can define different slopes for different configured $T_j$ thresholds. The parameters of $T_j$ threshold and different slopes for each $T_j$ threshold can be further enhanced based on benchmark performances of the system and/or the heat-generating components and components of the mobile device.

In yet another embodiment of the current invention, the adaptive $T_j$ heat up slope control for time prediction is used. In the adaptive prediction time method, the mobile device dynamically sends $T_j$ slope feed back to the thermal management of the mobile device. The thermal management adjusts the power of the system accordingly to control the temperature such that the temperature stabilized at a predefined fixed predicted time. In one embodiment, micro-throttle may even disable one or more heat-generating components.

Figure 7:
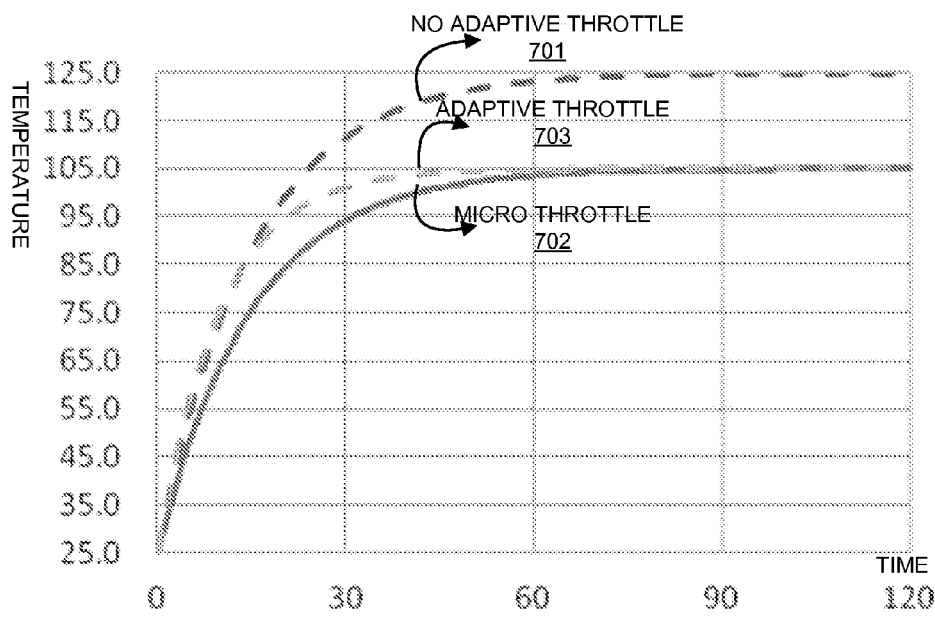
FIG. 7 illustrates different temperature curves applying different embodiments of temperature slope control with micro-throttle.

FIG. 7 illustrates different temperature curves applying different embodiments of temperature slope control with micro-throttle. Graph 701 is the temperature curve when there is no micro thermal management. As shown in graph 701, the temperature will rise to over 115° C. without adaptive thermal control. Graph 702 is the temperature curve of a micro thermal control. As shown in graph 702, the thermal management starts to control the temperature curve from lower temperature, for example at 45° C. The adaptive thermal control configures one or more multi-stage temperature thresholds, $T_{bound}\#j$. Upon detecting the temperature rises above one of the configured temperature threshold, the adaptive thermal control uses a new control method. The control method would throttle between high performance frequency and lower performance frequencies with preconfigured high frequency to low frequency ratios. In one embodiment, the micro thermal control is customized to different models to achieve better temperature curve. For example, one or more benchmarks are obtained for a particular model of the mobile device. Temperature thresholds and high-low frequency ratio are preconfigured based on these benchmark measures. Further, the values of the high frequency and low frequency are also configured for each temperature threshold. As shown in graph 702, with adaptive throttle control, the temperature rises under control and stays below 105° C. Graph 703 is the temperature curve for an adaptive thermal throttle. As shown, Graph 703 is further enhanced for thermal control. The adaptive thermal control would dynamically adjust thermal control parameters, such as temperature threshold, high frequency, low frequency, and high frequency to low frequency ratios. The thermal control parameters are dynamically adjusted based on detected system condition. The system thermal conditions, such as the current temperature, temperature indicators, and heat-generating events, are detected by the mobile device. In one embodiment, the hardware (e.g. CPU the heat source) may notify the thermal management about heat-generation event. The heat-generation event may include the predicted heat it may generate or parameters of the event such the thermal management may derive a thermal prediction based on the parameters. In another embodiment, the thermal management may monitor one or more driver behaviors. The thermal management may predict system thermal condition changes based on the detected driver behaviors. The system thermal condition may be an indicator of generated heat or an indicator of heat about to be generated. The latter indicator enables the thermal management to adjust proactively the thermal control.

The thermal management can be further enhanced. In one embodiment, adaptive time-based $T_j$ slope control is used. The adaptive throttling method can be adaptively applied to different chips. For example, the adaptive method can be based on CPU or GUP thermal performance using benchmark score, such AnTuTu. In another embodiment, context-aware dynamic thermal management (DTM) is used. The context-aware DTM applies different strategies based on different benchmarks to achieve the best thermal performance. In yet another embodiment, a hybrid use of different strategies can be employed to enhance further the performance. Thermal management applies separate methods for different stages of the thermal control. For example, before the temperature rises to $T_{bound}$, methods of slope control or adaptive slope control can be used; while after the temperature rises above $T_{bound}$, constant control can be used. In the second stage of the thermal control when the temperature rises above $T_{bound}$, the thermal management can further prioritize the control performance of different heat-generating components or components of the mobile device. For example, the thermal management can prioritize to adjust the performance of GPU first based on preconfigured/predefined criteria. In one embodiment, micro-throttle may even disable one or more heat-generating components.

Figure 8:
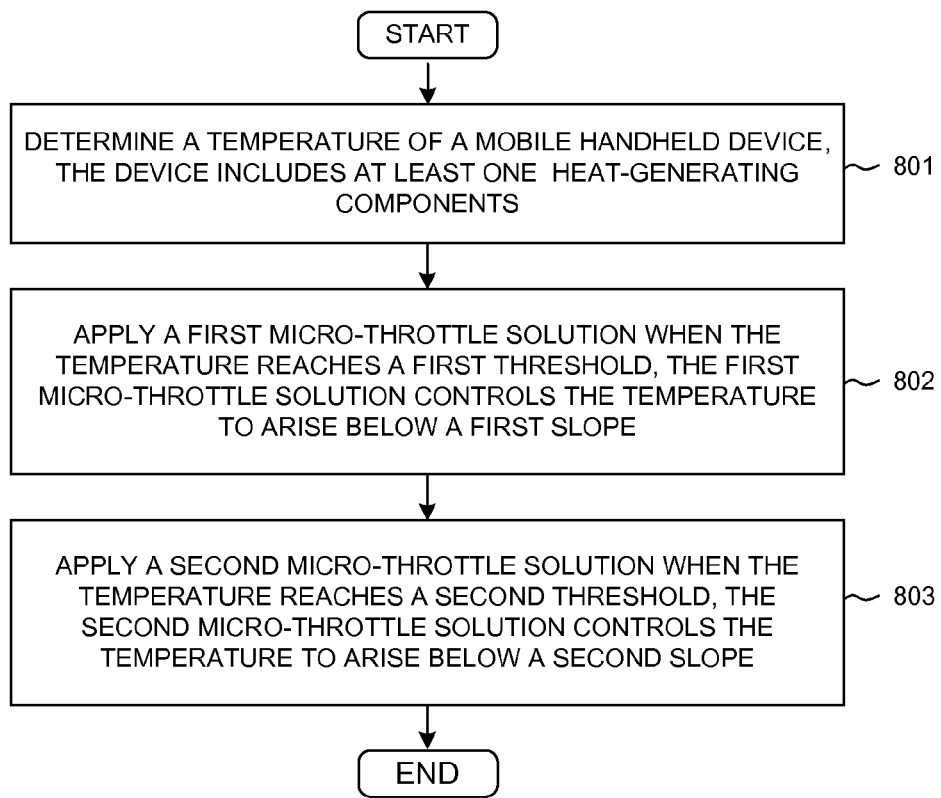
FIG. 8 is a flow chart of a method of applying thermal policy using micro-throttle in accordance with one novel aspect.

FIG. 8 is a flow chart of a method of applying thermal policy using micro-throttle in accordance with one novel aspect. At step 801, the mobile device determines a temperature of the mobile device, wherein the mobile device comprises at least one heat-generating components. At step 802, the mobile device applies a first micro-throttle solution when the temperature reaches a first threshold, wherein the first micro-throttle solution controls the temperature to arise below a first slope. At step 803, the mobile device applies a second micro-throttle solution when the temperature reaches a second threshold, wherein the second micro-throttle solution controls the temperature to arise below a second slope. In one embodiment, the second slope may be the same as the first slope. In another embodiment, the second micro-throttle solution may be the same as the first micro-throttle solution. In one embodiment, micro-throttle may even disable one or more heat-generating components.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   determining a temperature of a mobile device, wherein the mobile device includes at least one heat-generating component;
   applying a first micro-throttle solution when the temperature reaches a first threshold, wherein the first micro-throttle solution controls the temperature to arise below a first slope; and
   applying a second micro-throttle solution when the temperature reaches a second threshold, wherein the second micro-throttle solution controls the temperature to arise below a second slope; wherein different slopes are defined for different thresholds based on a benchmark performance of the mobile device.

2. The method of claim 1, wherein the at least one heat-generating component comprises at least one of a Central processing unit (CPU) and a graphic processing unit (GPU).

3. The method of claim 1, wherein the micro-throttle solution comprises controlling an operating voltage of at least one of the at least one heat-generating component.

4. The method of claim 1, wherein the micro-throttle solution comprises controlling an operating frequency of at least one of the at least one heat-generating component.

5. The method of claim 1, wherein the micro-throttle solutions are determined based on the benchmark performance of the mobile device.

6. The method of claim 1, wherein the thresholds and corresponding slopes are adaptively adjusted based on a dynamic temperature slope feedback.

7. The method of claim 6, wherein the temperature slope feedback comprises one or more indicators comprising a temperature indictor and a hardware event indicator, wherein the temperature indicator indicates detecting of heat generated, and wherein the hardware event indicator indicates one or more heat-generating occur.

8. The method of claim 6, wherein the adaptive adjusting involves controlling the temperature such that the temperature reaches a final threshold after a predefined time.

9. The method of claim 1, wherein the mobile device applies normal thermal throttle solution after the temperature reaches a final threshold.

10. A mobile device comprising:
    at least one heat-generating component;
    a thermal sensor that determines a temperature of the mobile device;
    a processor that applies a first micro-throttle solution when the temperature reaches a first threshold, wherein the first micro-throttle solution controls the temperature to arise below a first slope, wherein the processor also applies a second micro-throttle solution when the temperature reaches a second threshold, and wherein the second micro-throttle solution controls the temperature to arise below a second slope; wherein different slopes are defined for different thresholds based on a benchmark performance of the mobile device.

11. The device of claim 10, wherein the at least one heat-generating component comprises at least one of a Central processing unit (CPU) and a graphic processing unit (GPU).

12. The device of claim 10, wherein the micro-throttle solution comprises controlling an operating voltage of at least one of the at least one heat-generating component.

13. The device of claim 10, wherein the micro-throttle solution comprises controlling an operating frequency of at least one of the at least one heat-generating component.

14. The device of claim 10, wherein the micro-throttle solutions are determined based on the benchmark performance of the mobile device.

15. The device of claim 10, wherein the thresholds and corresponding slopes are adaptively adjusted based on a dynamic temperature slope feedback.

16. The device of claim 15, wherein the temperature slope feedback comprises one or more indicators comprising a temperature indictor and a hardware event indicator, wherein the temperature indicator indicates detecting of heat generated, and wherein the hardware event indicator indicates one or more heat-generating occur.

17. The device of claim 15, wherein the adaptive adjusting involves controlling the temperature such that the temperature reaches a final threshold after a predefined time.

18. The device of claim 10, wherein the mobile device applies normal thermal throttle solution after the temperature reaches a final threshold.

\* \* \* \* \*